(12) United States Patent
Jung et al.

(10) Patent No.: US 9,360,717 B2
(45) Date of Patent: Jun. 7, 2016

(54) LIQUID CRYSTAL DISPLAY

(71) Applicant: Samsung Display Co., Ltd., Yongin (KR)

(72) Inventors: Mee-Hye Jung, Suwon-si (KR); Ji-Won Sohn, Seoul (KR); Jae-Jin Lyu, Yongin-si (KR); Chong-Chul Chai, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 21 days.

(21) Appl. No.: 14/542,329

(22) Filed: Nov. 14, 2014

(65) Prior Publication Data

US 2015/0062516 A1 Mar. 5, 2015

Related U.S. Application Data

(63) Continuation of application No. 14/078,070, filed on Nov. 12, 2013, now Pat. No. 8,909,020, which is a continuation of application No. 13/908,467, filed on Jun. 3, 2013, now Pat. No. 8,610,866, which is a (Continued)

(30) Foreign Application Priority Data

Mar. 28, 2008 (KR) ......... 10-2008-0029090

(51) Int. Cl.
*G02F 1/1343* (2006.01)
*G02F 1/1337* (2006.01)
*G02F 1/1362* (2006.01)

(52) U.S. Cl.
CPC ........ *G02F 1/134336* (2013.01); *G02F 1/1337* (2013.01); *G02F 1/13624* (2013.01); *G02F 1/133753* (2013.01); *G02F 1/134309* (2013.01); *G02F 2001/133715* (2013.01)

(58) Field of Classification Search
None
See application file for complete search history.

(56) References Cited

U.S. PATENT DOCUMENTS

| 5,831,706 A | 11/1998 | Lyu |
| 6,384,889 B1 * | 5/2002 | Miyachi ............ G02F 1/133707 349/129 |
| 6,710,825 B2 | 3/2004 | Kubo et al. |

(Continued)

FOREIGN PATENT DOCUMENTS

| CN | 1811535 | 8/2006 |
| CN | 101546073 | 6/2013 |

(Continued)

OTHER PUBLICATIONS

Korean Office Action dated Sep. 29, 2015, in Korean Patent Application No. 10-2014-0195784.

(Continued)

*Primary Examiner* — Rhonda Peace
(74) *Attorney, Agent, or Firm* — H.C. Park & Associates, PLC

(57) ABSTRACT

A liquid crystal display includes a pixel electrode including a first subpixel electrode and a second subpixel electrode spaced apart with a gap therebetween, a common electrode facing the pixel electrode, and a liquid crystal layer formed between the pixel electrode and the common electrode and including a plurality of liquid crystal molecules. The first and second subpixel electrodes include a plurality of branches, and each of the first and second subpixel electrodes includes a plurality of subregions. The branches extend in different directions in different subregions.

15 Claims, 17 Drawing Sheets

Related U.S. Application Data continuation of application No. 13/590,726, filed on Aug. 21, 2012, now Pat. No. 8,462,305, which is a continuation of application No. 13/230,329, filed on Sep. 12, 2011, now Pat. No. 8,253,908, which is a continuation of application No. 12/328,324, filed on Dec. 4, 2008, now Pat. No. 8,035,787.

(56) References Cited

U.S. PATENT DOCUMENTS

| | | | |
|---|---|---|---|
| 7,023,516 | B2 | 4/2006 | Yoshida et al. |
| 7,113,241 | B2 | 9/2006 | Hanaoka |
| 7,145,622 | B2 | 12/2006 | Kataoka |
| 7,342,628 | B2 | 3/2008 | Kim et al. |
| 7,342,629 | B2 | 3/2008 | Yoshida et al. |
| 7,375,781 | B2 * | 5/2008 | Kubo ............ G02F 1/133555 349/114 |
| 7,385,662 | B2 | 6/2008 | Yoshida et al. |
| 7,391,490 | B2 | 6/2008 | Nakanishi et al. |
| 7,420,647 | B2 | 9/2008 | Nakahata |
| 7,499,136 | B2 * | 3/2009 | Kubo ............ G02F 1/133707 349/130 |
| 7,518,684 | B2 | 4/2009 | Huang et al. |
| 7,675,595 | B2 | 3/2010 | Wu et al. |
| 7,719,623 | B2 | 5/2010 | Hsieh et al. |
| 7,719,652 | B2 | 5/2010 | Son et al. |
| 7,760,310 | B2 | 7/2010 | Chen et al. |
| 7,768,616 | B2 | 8/2010 | Huang et al. |
| 7,821,608 | B2 | 10/2010 | Shinichi et al. |
| 7,916,244 | B2 | 3/2011 | Hur et al. |
| 7,936,430 | B2 | 5/2011 | Kim et al. |
| 8,035,787 | B2 | 10/2011 | Jung et al. |
| 8,253,908 | B2 | 8/2012 | Jung et al. |
| 8,610,866 | B2 | 12/2013 | Jung et al. |
| 2002/0036744 | A1 | 3/2002 | Kubo et al. |
| 2003/0071952 | A1 | 4/2003 | Yoshida et al. |
| 2003/0156237 | A1 | 8/2003 | Lin et al. |
| 2004/0223112 | A1 | 11/2004 | Taniguchi |
| 2005/0243248 | A1 | 11/2005 | Yoon et al. |
| 2006/0119756 | A1 | 6/2006 | Shin et al. |
| 2006/0125992 | A1 | 6/2006 | Yoshida et al. |
| 2006/0164352 | A1 | 7/2006 | Yoo et al. |
| 2007/0097279 | A1 | 5/2007 | Sugiura |
| 2007/0120092 | A1 | 5/2007 | Kataoka |
| 2007/0229746 | A1 | 10/2007 | Kim et al. |
| 2007/0235735 | A1 | 10/2007 | Kim et al. |
| 2007/0268434 | A1 | 11/2007 | Huang et al. |
| 2008/0018573 | A1 | 1/2008 | Hsieh et al. |
| 2008/0036931 | A1 | 2/2008 | Chan et al. |
| 2008/0111963 | A1 | 5/2008 | Wu et al. |
| 2008/0278651 | A1 | 11/2008 | Lee et al. |
| 2009/0009449 | A1 | 1/2009 | Uchida et al. |
| 2009/0046233 | A1 | 2/2009 | Cho et al. |
| 2009/0086144 | A1 | 4/2009 | Chen et al. |
| 2009/0086149 | A1 | 4/2009 | Kim |
| 2009/0190058 | A1 | 7/2009 | Jung et al. |
| 2009/0310075 | A1 | 12/2009 | Kim |
| 2010/0001276 | A1 | 1/2010 | Kim et al. |
| 2010/0020281 | A1 | 1/2010 | Jung et al. |
| 2010/0053528 | A1 | 3/2010 | Li et al. |
| 2010/0079690 | A1 | 4/2010 | Lee et al. |
| 2010/0157232 | A1 | 6/2010 | Kim et al. |
| 2010/0195034 | A1 | 8/2010 | Lee et al. |
| 2010/0265448 | A1 | 10/2010 | Nakanishi et al. |
| 2010/0283928 | A1 | 11/2010 | Yoshida et al. |
| 2014/0063395 | A1 | 3/2014 | Jung et al. |

FOREIGN PATENT DOCUMENTS

| | | |
|---|---|---|
| JP | 2000-122066 | 4/2000 |
| JP | 2003-186017 | 7/2003 |
| JP | 2003-330043 | 11/2003 |
| JP | 2004-302061 | 10/2004 |
| JP | 2004-302195 | 10/2004 |
| JP | 2006-201451 | 8/2006 |
| JP | 2006-330375 | 12/2006 |
| JP | 2006-330638 | 12/2006 |
| JP | 2008-015512 | 1/2008 |
| KR | 1020030066427 | 8/2003 |
| KR | 10-2003-0082405 | 10/2003 |
| KR | 10-2006-0044418 | 5/2006 |
| KR | 1020060043315 | 5/2006 |
| KR | 10-2006-0086175 | 7/2006 |
| KR | 10-2006-0121720 | 11/2006 |
| KR | 10-2006-0125708 | 12/2006 |
| KR | 1020070007604 | 1/2007 |

OTHER PUBLICATIONS

Korean Office Action dated Mar. 31, 2015, in Korean Patent Application No. 10-2014-0195784.
European Search Report dated Jun. 16, 2009, in European Patent Application No. 08021670.8.
Non-Final Office Action dated Jan. 13, 2011, in U.S. Appl. No. 12/328,324.
Notice of Allowance dated Jun. 14, 2011, in U.S. Appl. No. 12/328,324.
Notice of Allowance dated Apr. 27, 2012, in U.S. Appl. No. 13/230,329.
Non-Final Office Action dated Sep. 24, 2012, in U.S. Appl. No. 13/590,726.
Notice of Allowance dated Feb. 11, 2013, in U.S. Appl. No. 13/590,726.
Notice of Allowance dated Oct. 18, 2013, in U.S. Appl. No. 13/908,467.
Non-Final Office Action dated Apr. 4, 2014, in U.S. Appl. No. 14/078,070.
Notice of Allowance dated Aug. 6, 2014, in U.S. Appl. No. 14/078,070.

* cited by examiner

LIQUID CRYSTAL DISPLAY

CROSS-REFERENCE TO RELATED APPLICATIONS

The present application is a continuation of U.S. patent application Ser. No. 14/078,070, filed on Nov. 12, 2013, which is a continuation of U.S. patent application Ser. No. 13/908,467, filed on Jun. 3, 2013, now issued as U.S. Pat. No. 8,610,866 on Dec. 17, 2013, which is a continuation of U.S. patent application Ser. No. 13/590,726, filed on Aug. 21, 2012, now issued as U.S. Pat. No. 8,462,305 on Jun. 11, 2013, which is a continuation of U.S. patent application Ser. No. 13/230,329, filed on Sep. 12, 2011, now issued as U.S. Pat. No. 8,253,908 on Aug. 28, 2012, which is a continuation of U.S. patent application Ser. No. 12/328,324, filed on Dec. 4, 2008, now issued as U.S. Pat. No. 8,035,787 on Oct. 11, 2011, and claims priority from and the benefit of Korean Patent Application No. 10-2008-0029090, filed on Mar. 28, 2008, each of which is hereby incorporated by reference for all purposes as if fully set forth herein.

BACKGROUND OF THE INVENTION

1. Field of the Invention

The present invention relates to a liquid crystal display.

2. Discussion of the Background

Liquid crystal displays (LCDs) are one of the most widely used flat panel displays, and an LCD includes a pair of panels provided with field-generating electrodes, such as pixel electrodes and a common electrode, and a liquid crystal (LC) layer disposed between the two panels. The LCD displays images when voltages are applied to the field-generating electrodes to generate an electric field in the LC layer, which determines the orientations of LC molecules therein, thereby adjusting the polarization of light incident thereto.

Among LCDs, a vertical alignment (VA) mode LCD, in which LC molecules are aligned such that the long axes of the LC molecules are perpendicular to the panels in the absence of an electric field, has been developed.

In a VA mode LCD, a wide viewing angle can be realized due to cutouts, such as slits in the field-generating electrodes and protrusions on the field-generating electrodes. Since the cutouts and protrusions may determine the tilt directions of the LC molecules, the tilt directions may be distributed in several directions using the cutouts and protrusions, thereby widening the reference viewing angle.

Also, a method for pretilting LC molecules in the absence of an electric field has been developed to improve the response speed of the LC molecules while realizing a wide viewing angle. For the LC molecules to pretilt in various directions, alignment layers having various alignment directions may be used. Alternatively, the LC layer may be subjected to an electric field and a thermal or light-hardened material may be added. Then light may be irradiated onto the LC layer to harden the thermal or light-hardening material, thereby pretilting the LC molecules.

However, the VA mode liquid crystal display may have lower side visibility compared with front visibility. To improve the side visibility, one pixel may be divided into two subpixels and different voltages may be applied to the subpixels.

SUMMARY OF THE INVENTION

The present invention provides a liquid crystal display that may have a wide viewing angle and a fast response speed, as well as excellent visibility and transmittance.

Additional features of the invention will be set forth in the description which follows, and in part will be apparent from the description, or may be learned by practice of the invention.

The present invention discloses a liquid crystal display including a pixel electrode including a first subpixel electrode and a second subpixel electrode spaced apart from each other with a gap therebetween, a common electrode facing the pixel electrode, and a liquid crystal layer disposed between the pixel electrode and the common electrode. The liquid crystal layer includes a plurality of liquid crystal molecules, and the first and second subpixel electrodes include a plurality of branches. Each of the first and second subpixel electrodes includes a plurality of subregions, and the branches extend in different directions in different subregions.

The present invention also discloses a liquid crystal display including a pixel electrode including a first subpixel electrode and a second subpixel electrode spaced apart from each other with a gap therebetween, a common electrode facing the pixel electrode, and a liquid crystal layer disposed between the pixel electrode and the common electrode and including a plurality of liquid crystal molecules. The liquid crystal layer includes a first portion disposed between the first subpixel electrode and the common electrode and a second portion disposed between the second subpixel electrode and the common electrode. Each of the first and second portions includes a plurality of subregions, and the liquid crystal molecules are aligned in different directions in different subregions. Areas of the subregions are different from each other in the first portion or in the second portion.

The present invention also discloses a liquid crystal display including a first signal line and a second signal line, a third signal line and a fourth signal line crossing the first and second signal lines, a pixel electrode including a first subpixel electrode and a second subpixel electrode spaced apart with a gap therebetween, a first switching element connected to the first signal line and the third signal line to transmit a data voltage from the third signal line to the first subpixel electrode, a second switching element connected to the first signal line and the fourth signal line to transmit a data voltage from the fourth signal line to the second subpixel electrode, a common electrode facing the pixel electrode, and a liquid crystal layer disposed between the pixel electrode and the common electrode and including a plurality of liquid crystal molecules. One of the first subpixel electrode and the second subpixel electrode includes a plurality of branches, and the one of the first subpixel electrode and the second subpixel electrode includes a plurality of subregions. The branches extend in different directions in different subregions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
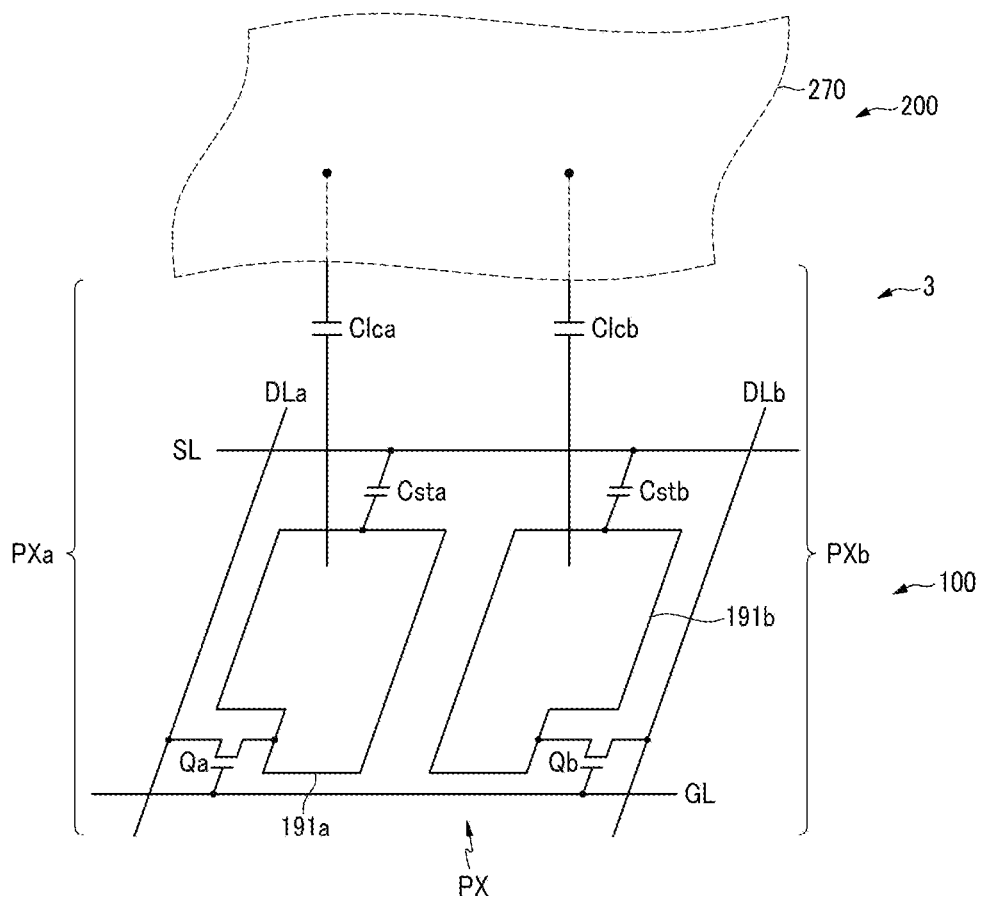
FIG. 1 is an equivalent circuit diagram of one pixel in a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is an equivalent circuit diagram of one pixel in a liquid crystal display according to an exemplary embodiment of the present invention.

Referring to FIG. 1, a liquid crystal display according to an exemplary embodiment of the present invention includes signal lines, which include a plurality of gate lines GL, a plurality of pairs of data lines DLa and DLb, and a plurality of storage electrode lines SL, and a plurality of pixels PX connected to the signal lines. The liquid crystal display includes a lower panel 100 and an upper panel 200 facing each other, and a liquid crystal layer 3 disposed therebetween.

Each pixel PX includes a pair of subpixels PXa and PXb. Each subpixel PXa/PXb includes a switching element Qa/Qb, a liquid crystal capacitor Clca/Clcb, and a storage capacitor Csta/Cstb.

Each switching element Qa/Qb is a three-terminal element, such as a thin film transistor, provided on a lower panel 100 and including a control terminal connected to the gate line GL, an input terminal connected to the data line DLa/DLb, and an output terminal connected to the liquid crystal capacitor Clca/Clcb and the storage capacitor Csta/Cstb.

The liquid crystal capacitor Clca/Clcb uses a subpixel electrode and a common electrode 270 as two terminals. The liquid crystal layer 3 between the electrodes 191a/191b and 270 functions as a dielectric material.

The storage capacitor Csta/Cstb serving as an assistant to the liquid crystal capacitor Clca/Clcb includes a storage electrode line SL on the lower display panel 100, a subpixel electrode 191a/191b overlapping the storage electrode line, and an insulator disposed therebetween. A voltage, such as a common voltage Vcom, is applied to the storage electrode line SL.

A difference is generated between the voltages charged to two liquid crystal capacitors Clca and Clcb. For example, the data voltage applied to the liquid crystal capacitor Clca may less than or greater than the data voltage applied to the liquid crystal capacitor Clcb. Therefore, when the voltages of the first and second liquid crystal capacitors Clca and Clcb are appropriately adjusted, it may be possible to make an image viewed from the side as similar as possible to an image viewed from the front, thereby improving the side visibility.

Next, a liquid crystal display according to an exemplary embodiment of the present invention will be described in detail with reference to FIG. 2, FIG. 3, FIG. 4, FIG. 5, FIG. 6, and FIG. 7.

Figure 2:
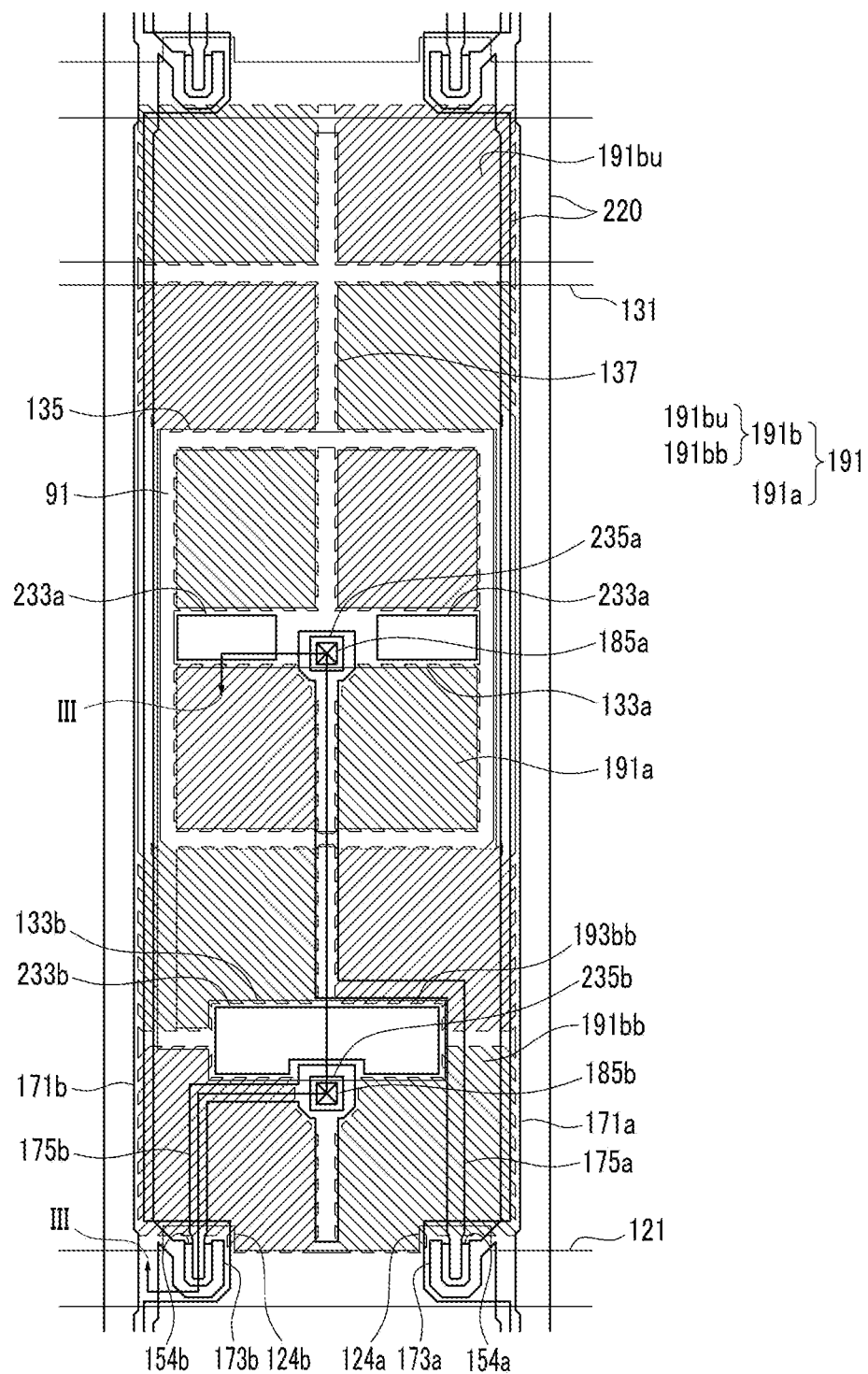
FIG. 2 is a layout view of a liquid crystal display according to an exemplary embodiment of the present invention.
Figure 3:
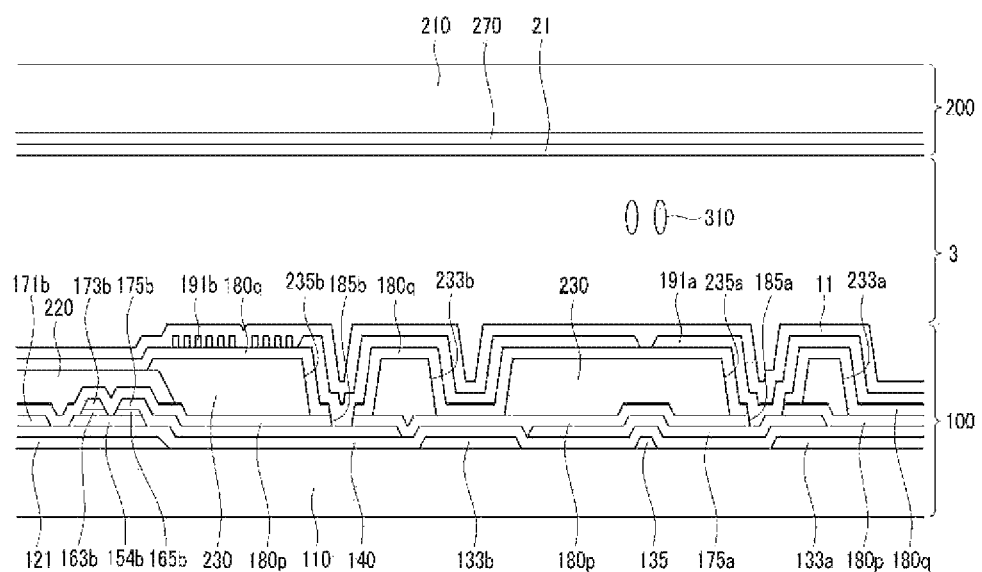
FIG. 3 is a cross-sectional view of the liquid crystal display shown in FIG. 2 taken along line III-III.
Figure 4:
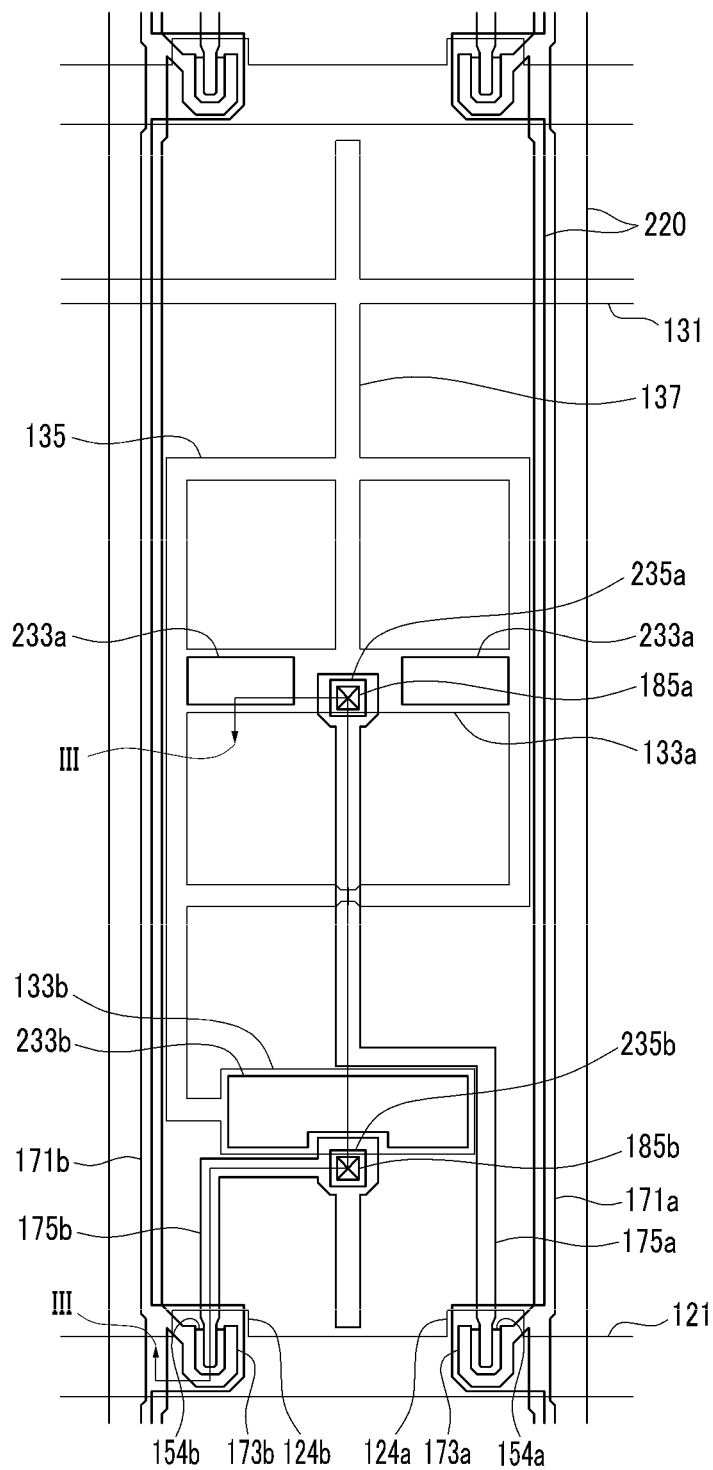
FIG. 4 is a layout view of the liquid crystal display shown in FIG. 2 without the pixel electrode.
Figure 5:
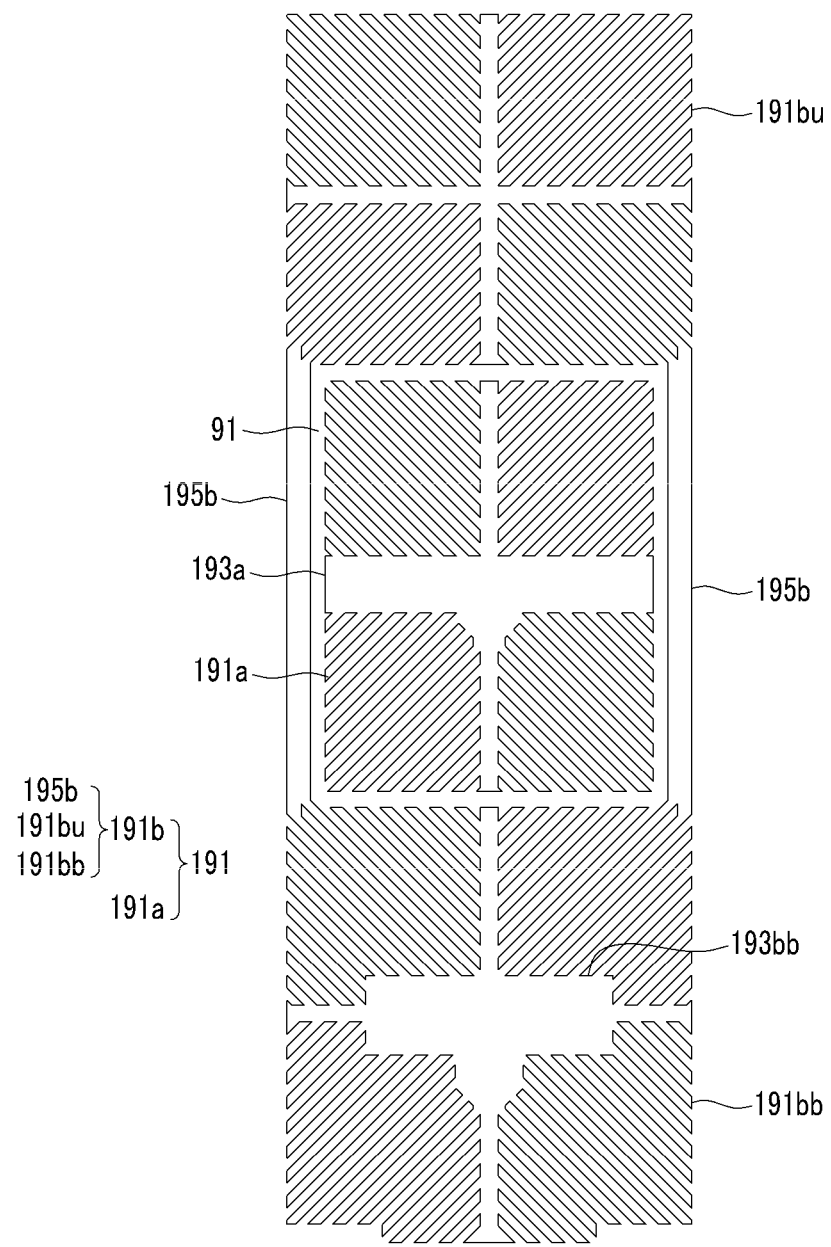
FIG. 5 is a top plan view showing the pixel electrode of the liquid crystal display show in FIG. 2.
Figure 6:
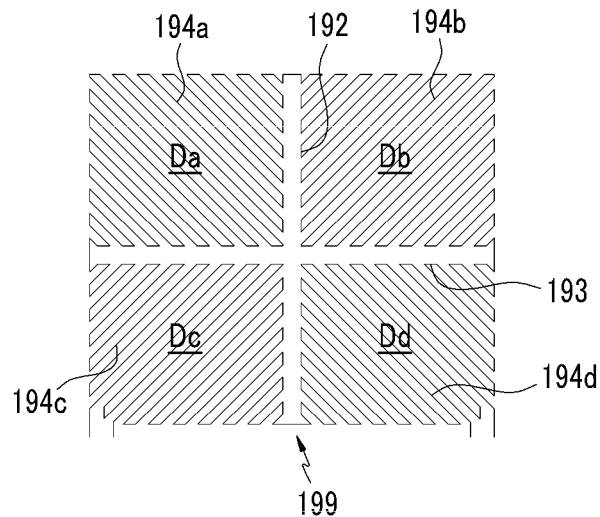
FIG. 6 is a top plan view of a basic electrode of the pixel electrode according to an exemplary embodiment of the present invention.
Figure 7:
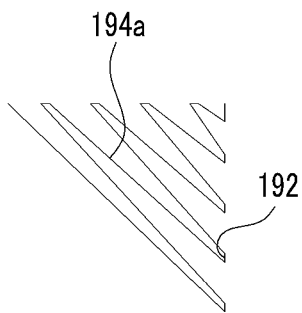
FIG. 7 is an enlarged view of the portion of the basic electrode shown in FIG. 6.

FIG. 2 is a layout view of a liquid crystal display according to an exemplary embodiment of the present invention, FIG. 3 is a cross-sectional view of the liquid crystal display shown in FIG. 2 taken along line III-III, FIG. 4 is a layout view of the liquid crystal display shown in FIG. 2 without the pixel electrode, FIG. 5 is a top plan view showing the pixel electrode of the liquid crystal display show in FIG. 2, FIG. 6 is a top plan view of a basic electrode of the pixel electrode according to an exemplary embodiment of the present invention, and FIG. 7 is an enlarged view of a portion of the basic electrode shown in FIG. 6.

Referring to FIG. 2 and FIG. 3, a liquid crystal display according to an exemplary embodiment of the present invention includes a lower panel 100 and an upper panel 200 facing each other, and a liquid crystal layer 3 disposed between the two panels 100 and 200.

First, the lower panel 100 will be described.

A plurality of gate lines 121 and a plurality of storage electrode lines 131 are formed on an insulating substrate 110.

The gate lines 121 transmit gate signals and extend in a transverse direction. Each gate line 121 includes a plurality of first and second gate electrodes 124a and 124b protruding upward.

The storage electrode lines 131 include a stem extending substantially parallel to the gate lines 121, and a plurality of branches extending from the stem. Each branch includes a longitudinal portion 137, a loop 135, a first storage electrode 133a, and a second storage electrode 133b.

The longitudinal portion 137 extends upward and downward from the stem (hereinafter, an imaginary straight line in the direction in which the longitudinal portion 137 extends is referred to as a "longitudinal center line").

The loop 135 may be substantially rectangular, and the upper edge thereof vertically may meet the longitudinal portion 137.

The first storage electrode 133a extends in a transverse direction from the center of the left edge of the loop 135 to the center of the right edge, and may have a wider width than the longitudinal portion 137 or the loop 135. The first storage electrode 133a and the longitudinal portion 137 vertically meet each other.

The left edge of the loop 135 extends downward and curves to the right to form the second storage electrode 133b. The width of the second storage electrode 133b is expanded and extends substantially parallel to the first storage electrode 133a in the transverse direction.

However, the shapes and arrangement of the storage electrode lines 131 may be modified in various forms.

A gate insulating layer 140 is formed on the gate lines 121 and the storage electrode lines 131 and a plurality of semiconductors 154a and 154b, which may be made of amorphous or crystallized silicon, are formed on the gate insulating layer 140.

A pair of ohmic contacts 163b and 165b are formed on the first semiconductor 154b, and the ohmic contacts 163b and 165b may be formed of a material such as n+ hydrogenated amorphous silicon in which an n-type impurity is doped with a high concentration or silicide.

A pair of data lines 171a and 171b and a plurality of first and second drain electrodes 175a and 175b are formed on the ohmic contacts 163b and 165b, and on the gate insulating layer 140.

The data lines 171a and 171b transmit data signals, extend substantially in the longitudinal direction, and cross the gate lines 121 and the storage electrode lines 131. Each data line 171a/171b includes a plurality of first/second source electrode 173a/173b extending toward the first/second gate electrode 124a/124b and curving with a "U" shape, and the first/second source electrode 173a/173b is opposite the first/second drain electrode 175a/175b with respect to the first/second gate electrode 124a/124b.

Each first drain electrode 175a has one end enclosed by the first source electrode 173a from which it extends upward, curves to the left following the upper edge of the second storage electrode 133b, and again extends upward near the longitudinal center line to form the other end. The other end of the first drain electrode 175a extends to where the second storage electrode 133b is disposed, and has a wide area for connection with another layer.

Each second drain electrode 175b has one end enclosed by the second source electrode 173b from which it extends upward to the second storage electrode 133b, curves to the right, extends following the lower edge of the second storage electrode 133b, expands with a wide area near the longitudinal center line, and again extends downward to form a longitudinal portion 176.

However, the shapes and arrangement of the first and second drain electrodes 175a and 175b and the data lines 171a and 171b may be modified in various ways.

A first/second gate electrode 124a/124b, a first/second source electrode 173a/173b, and a first/second drain electrode 175a/175b respectively form a first/second thin film transistor (TFT) Qa/Qb along with a first/second semiconductor 154a/154b, and a channel of the first/second thin film transistor Qa/Qb is formed on the first/second semiconductor 154a/154b between the first/second source electrode 173a/173b and the first/second drain electrode 175a/175b.

The ohmic contacts 163b and 165b are disposed only between the underlying semiconductor islands 154a and 154b and the overlying data lines 171a and 171b and drain electrodes 175a and 175b, and may reduce contact resistance between them. The semiconductors 154a and 154b each have a portion that is exposed without being covered by the data lines 171a and 171b and the drain electrodes 175a and 175b, and a portion between the source electrodes 173a and 173b and the drain electrodes 175a and 175b.

A lower passivation layer 180p, which may be made of silicon nitride or silicon oxide, is formed on the data lines 171a and 171b, the drain electrodes 175a and 175b, and the exposed portions of the semiconductors 154a and 154b.

A black matrix including a plurality of light blocking members 220 spaced at intervals from each other is formed on the lower passivation layer 180p. Each light blocking member 220 may include a stripe portion extending upward and downward, and a quadrangle portion corresponding to the thin film transistor to prevent light leakage.

A plurality of color filters 230 are formed on the lower passivation layer 180p and the light blocking members 220. The color filters 230 are mostly formed in a region surrounded by light blocking members 220. The color filters 230 have a plurality of holes 235a and 235b disposed on the first and second drain electrodes 175a and 175b, and a plurality of openings 233a and 233b disposed on the first and second storage electrodes 133a and 133b, respectively. The opening 233a and 233b reduce the thickness of the dielectric material forming the storage capacitors Csta and Cstb such that the storage capacitance may be increased.

Here, the lower passivation layer 180p may prevent pigments of the color filter 230 from flowing into the exposed semiconductors 154a and 154b.

An upper passivation layer 180q is formed on the light blocking members 220 and the color filters 230. The upper passivation layer 180q may be made of an inorganic insulating material, such as silicon nitride or silicon oxide, and may prevent the color filters 230 from lifting and suppress the contamination of the liquid crystal layer 3 by the organic material, such as a solvent flowing from the color filters 230, so defects generated during driving, such as an afterimage, may be prevented.

However, at least one of the light blocking members 220 and the color filters 230 may be disposed on the upper panel 200, and one of the lower passivation layer 180p and the upper passivation layer 180q of the lower panel 100 may be omitted in this case.

The upper passivation layer 180q and the lower passivation layer 180p have a plurality of contact holes 185a and 185b respectively exposing the first and second drain electrodes 175a and 175b.

A plurality of pixel electrodes 191 is formed on the upper passivation layer 180q, and the above-described color filters 230 may extend according to a column of the pixel electrodes 191.

Referring to FIG. 5, each pixel electrode 191 includes the first and second subpixel electrodes 191a and 191b that are spaced apart from each other with a gap 91 having a quadrangular belt shape therebetween, and the first and second subpixel electrodes 191a and 191b respectively include a basic electrode 199 shown in FIG. 6, or at least one modification thereof.

Next, the basic electrode 199 will be described in detail with reference to FIG. 6.

As shown in FIG. 6, the basic electrode 199 may be a quadrangle and may include a cross-shaped stem having a transverse stem 193 that crosses a longitudinal stem 192. Also, the basic electrode 199 is divided into a first subregion Da, a second subregion Db, a third subregion Dc, and a fourth subregion Dd by the transverse stem 193 and the longitudinal stem 192, and each subregion Da-Dd includes a plurality of first, second, third, and fourth branches 194a, 194b, 194c, and 194d.

The first branch 194a extends obliquely from the transverse stem 193 or the longitudinal stem 192 in the upper-left direction, as shown in FIG. 7, and the second branch 194b extends obliquely from the transverse stem 193 or the longitudinal stem 192 in the upper-right direction. Also, the third branch 194c extends obliquely from the transverse stem 193 or the longitudinal stem 192 in the lower-left direction, and the fourth branch 194d extends obliquely from the transverse stem 193 or the longitudinal stem 192 in the lower-right direction.

The first, second, third, and fourth branches 194a, 194b, 194c, and 194d form an angle of about 45 degrees or 135 degrees with the gate lines 121 or the transverse stem 193. Also, the branches 194a, 194b, 194c, and 194d of two neighboring subregions Da, Db, Dc, and Dd may be crossed.

The width of the branches 194a, 194b, 194c, and 194d may be in the range of 2.5 μm to 5.0 μm, and the interval between the neighboring branches 194a, 194b, 194c, and 194d in one subregion Da, Db, Dc, and Dd may be in the range of 2.5 μm to 5.0 μm.

Also, referring to FIG. 7, the width of the branches 194a, 194b, 194c, and 194d may become wider approaching the transverse stem 193 or the longitudinal stem 192, and the difference between the widest width and the narrowest width in one of the branches 194a, 194b, 194c, and 194d may be in the range of 0.2 μm to 1.5 μm.

Again, referring to FIG. 2, FIG. 3, FIG. 4, and FIG. 5, the first subpixel electrode 191a includes one basic electrode 199 as shown in FIG. 6. The transverse stem 193 of the basic electrode 199 forming the first subpixel electrode 191a expands downward and upward to form a first expansion 193a, and the first expansion 193a overlaps the first storage electrode 133a. Also, the protrusion that protrudes downward to contact the first drain electrode 175a is formed in the center of the downward edge of the first expansion 193a.

The second subpixel electrode 191b includes an upper electrode 191bu and a lower electrode 191bb, and each of the upper electrode 191bu and the lower electrode 191bb includes one basic electrode 199. The upper electrode 191bu and the lower electrode 191bb are connected to each other through left and right connections 195b.

The second subpixel electrode 191b encloses the first subpixel electrode 191a with the gap 91 therebetween. A portion of the center of the transverse stem of the lower electrode 191bb extends upward and downward to form a second expansion 193bb overlapping the second storage electrode 133b. Also, the protrusion that protrudes downward to contact the second drain electrode 175b is formed in the center of the downward edge of the second expansion 193bb.

The area of the second subpixel electrode 191b may be about 1.0 to 2.2 times the area of the first subpixel electrode 191a.

Each first/second subpixel electrode 191a/191b is connected to the first/second drain electrode 175a/175b through the contact hole 185a/185b, and receives data voltages from the first/second drain electrode 175a/175b.

On the other hand, the upper electrode 191bu may receive the data voltages directly from the second drain electrode 175b. In this case, the second drain electrode 175b extends to the upper electrode 191bu, and a contact hole (not shown) through which the upper electrode 191bu contacts the second drain electrode 175b is required. In this case, the left and right connections 195b are not necessary.

An alignment layer 11 is formed on the pixel electrodes 191.

Next, the upper panel 200 will be described.

A common electrode 270 is formed on an insulating substrate 210, and an alignment layer 21 is formed thereon.

Each alignment layer 11 and 21 may be a vertical alignment layer.

Finally, polarizers (not shown) may be provided on the outer surface of the display panels 100 and 200.

The liquid crystal layer 3 disposed between the lower panel 100 and the upper panel 200 includes liquid crystal molecules 310 and polymers 350 and 370 having negative dielectric anisotropy.

The liquid crystal molecules 310 are pretilted by the polymers 350 and 370 for the long axis thereof to be parallel to the directions in which the first, second, third, and fourth branches 194a, 194b, 194c, and 194d of the first and second subpixel electrode 191a and 191b extend, and are aligned vertically with respect to the surface of the two panels 100 and 200. Accordingly, the first and second subpixels PXa and PXb each include four subregions Da, Db, Dc, and Dd in which the liquid crystal molecules 310 are pretilted in different directions.

If the gate lines 121 are applied with the gate signals, the data voltage is applied to the first and second subpixel electrodes 191a and 191b through the data lines 171a and 171b. Then, the first and second subpixel electrodes 191a and 191b receive the data voltage and the common electrode 270 receives the common voltage, thereby generating an electric field in the liquid crystal layer 3. Accordingly, the liquid crystal molecules 310 of the liquid crystal layer 3 are arranged in response to the electric field such that the major axes of the liquid crystal molecules 310 change direction to be perpendicular to the direction of the electric field. The degree to which the polarization of light incident to the liquid crystal layer 3 changes depends on the inclination degree of the liquid crystal molecules 310, and the change in the polarization is represented by a change in the transmittance by a polarizer, thereby causing the liquid crystal display to display an image.

On the other hand, the edges of the branches 194a, 194b, 194c, and 194d distort the electric field to make the horizontal components perpendicular to the edges of the branches 194a, 194b, 194c, and 194d, and the alignment of the liquid crystal molecules 310 is determined by the horizontal components. Accordingly, the liquid crystal molecules 310 first tend to tilt in a direction perpendicular to the edges of the branches 194a, 194b, 194c, and 194d. However, the directions of the horizontal components of the electric field by the neighboring branches 194a, 194b, 194c, and 194d are opposite to each other and the intervals between the branches 194a, 194b, 194c, and 194d are narrow such that the liquid crystal molecules 310, which tend to arrange in opposite directions, are tilted in the direction parallel to the directions in which the branches 194a, 194b, 194c, and 194d extend. Accordingly, if the liquid crystal molecules 310 are not initially pretilted in the direction in which the branches 194a, 194b, 194c, and 194d extend, the liquid crystal molecules 310 may be tilted in the directions in which the branches 194a, 194b, 194c, and 194d extend through two steps. However, in the present exemplary embodiment, the liquid crystal molecules 310 are already pretilted in a direction parallel to the directions of in which branches 194a, 194b, 194c, and 194d extend so the liquid crystal molecules 310 are pretilted in one step. Therefore, if the liquid crystal molecules 310 are pretilted, they may be tilted in the required direction in one step such that the response speed of the liquid crystal display may be improved.

Also, in an exemplary embodiment of the present invention, the branches 194a, 194b, 194c, and 194d extend in different directions in one pixel PX such that the liquid crystal molecules 310 are inclined in four directions. Therefore, the viewing angle of the liquid crystal display may be widened by varying the inclined directions of the liquid crystal molecules.

The first/second sub-pixel electrode 191a/191b and the common electrode 270 form the liquid crystal capacitor Clca/Clcb to maintain an applied voltage even after the TFT is turned off. Also, the first and second storage electrodes 133a and 133b of the storage electrode line 131 respectively overlap the first and second subpixel electrodes 191a and 191b in the openings 188a and 188b to form the storage capacitors Csta and Cstb.

The loop 135 of the storage electrode line 131 overlaps the gap 91 of the pixel electrode 191 such that it functions as a shielding member to block light leakage between the first subpixel electrode 191a and the second subpixel electrode 191b. The loop 135 disposed between the data lines 171a and 171b, and the first subpixel electrode 191a, may prevent crosstalk, which may reduce degradation of the display quality.

Also, in the structure of pixel electrode 191 in an exemplary embodiment of the present invention, the alignment of the liquid crystal molecules 310 may not be controlled near the longitudinal and the transverse stems of the first and second subpixel electrodes 191a and 191b so texture may be generated. Accordingly, the storage electrode line 131, the longitudinal portion 137 of the storage electrode line 131, and the first and second storage electrodes 133a and 133b overlap the transverse stem or the longitudinal stem of the first and second subpixel electrodes 191a and 191b such that the texture may be covered, so the aperture ratio may be increased.

On the other hand, the first subpixel electrode 191a and the second subpixel electrode 191b are applied with different data voltages through the different data lines 171a and 171b, and the voltage of the first subpixel electrode 191a having a relatively small area is higher than the voltage of the second subpixel electrode 191b having a relatively large area.

In this way, if the voltages of the first sub-pixel electrode 191a and the second sub-pixel electrode 191b are different from each other, the voltage applied to the first liquid crystal capacitor Clca formed between the first sub-pixel electrode 191a and the common electrode 270 and the voltage applied to the second liquid crystal capacitor Clcb formed between the second sub-pixel electrode 191b and the common electrode 270 are different from each other such that the declination angle of the liquid crystal molecules of the subpixels PXa and PXb are different from each other, and as a result the luminance of the two subpixels become different. Accordingly, if the voltages of the first and second liquid crystal capacitors Clca and Clcb are appropriately controlled, the images shown at the side may be approximate to the image shown at the front, that is to say, the gamma curve of the side may be approximately close to the gamma curve of the front, which may improve the side visibility.

Also, in an exemplary embodiment of the present invention, if the first subpixel electrode 191a applied with the higher voltage is disposed in the center of the pixel PX, the first subpixel electrode 191a is father apart from the gate line 121 such that an overlapping portion therebetween is not generated, which may reduce a kick-back voltage and remove flicker.

Next, the alignment method for initially pretilting liquid crystal molecules 310 will be described with reference to FIG. 8.

Figure 8:
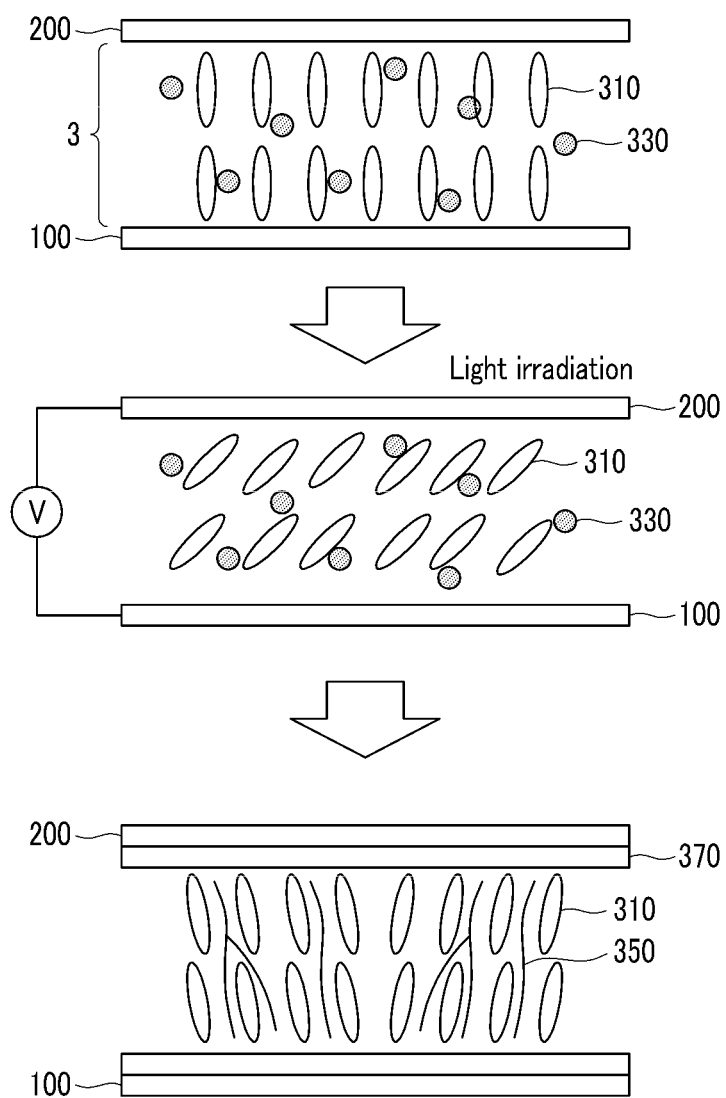
FIG. 8 is a view showing a process of pretilting liquid crystal molecules using prepolymers polarized by light such as ultraviolet rays.

FIG. 8 is a view showing a process for pretilting liquid crystal molecules using prepolymers, which are polymerized by light such as ultraviolet rays.

First, prepolymers 330, such monomers, which are hardened through polymerization by light such as ultraviolet rays, are inserted between the two display panels 100 and 200 along with the liquid crystal material. The prepolymers 330 may include reactive mesogen that is polymerized by light, such as ultraviolet rays.

Next, the first and second subpixel electrodes 191a and 191b receive the data voltages and the common electrode 270 of the upper panel 200 receives the common voltage to generate an electric field to the liquid crystal layer 3 between two display panels 100 and 200. Thus, the liquid crystal molecules 310 of the liquid crystal layer 3 are inclined in a direction parallel to the length direction of the branches 194a, 194b, 194c, and 194d through two steps, as above-described, in response to the electric field, and the liquid crystal molecules 310 in one pixel PX are inclined in a total of four directions.

If the liquid crystal layer 3 is irradiated, for example, with ultraviolet rays, after the application of the electric field to the liquid crystal layer 3, the prepolymers 330 are polymerized such that the first polymer 350 and the second polymer 370 are formed as shown in FIG. 8.

The first polymer 350 is formed in the liquid crystal layer 3, and the second polymer 370 is formed close to the display panels 100 and 200. The liquid crystal molecules 310 are pretilted in the directions in which the branches 194a, 194b, 194c, and 194d extend by the first and second polymers 350 and 370.

Accordingly, the liquid crystal molecules 310 are arranged to pretilt in four different directions when no voltage is applied to the electrodes 191 and 270.

Next, another exemplary embodiment of the present invention will be described with the reference to FIG. 9, FIG. 10, and FIG. 11.

Figure 9:
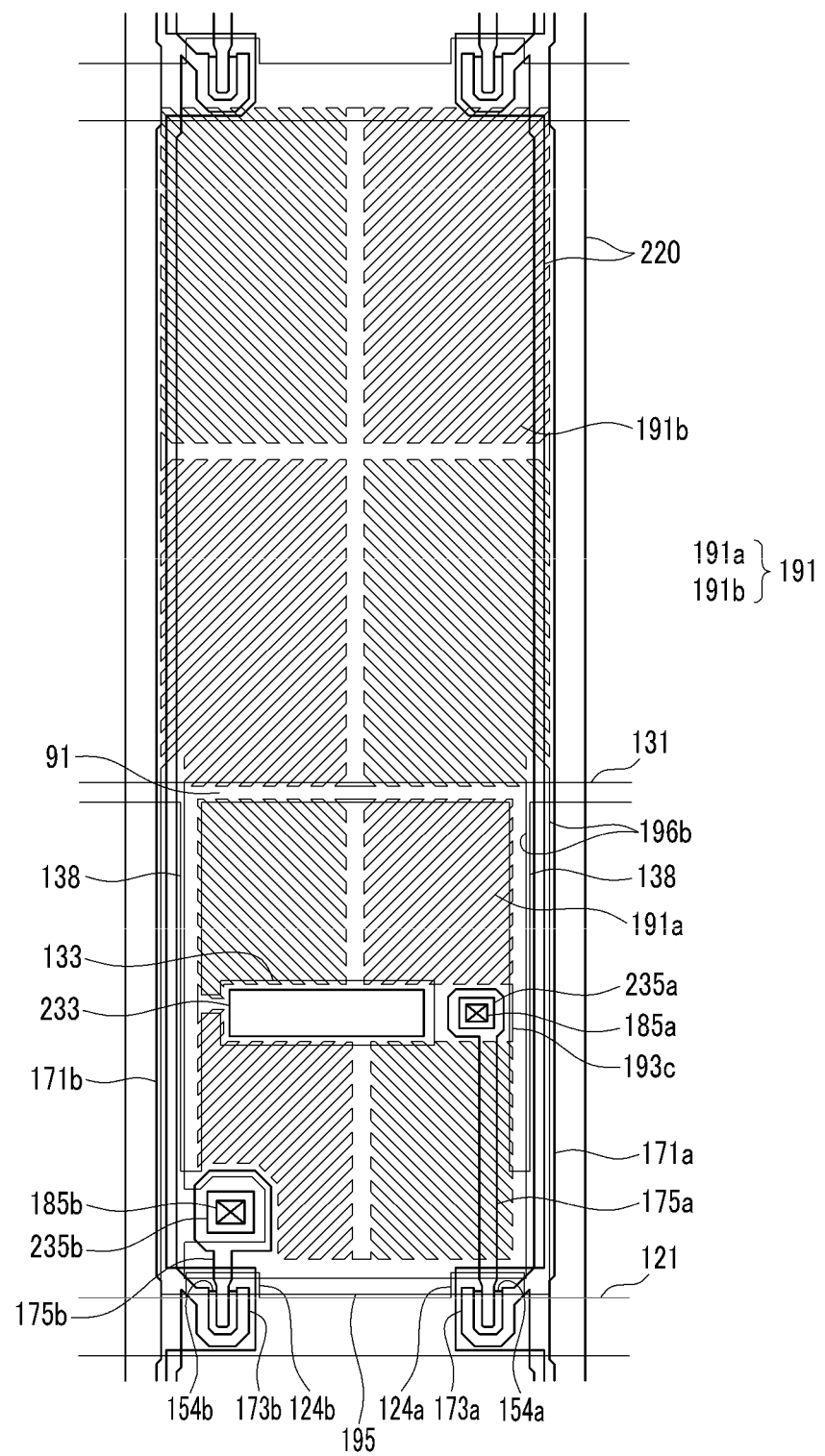
FIG. 9, FIG. 12, and FIG. 15 are layout views of a liquid crystal display according to another exemplary embodiment of the present invention.
Figure 10:
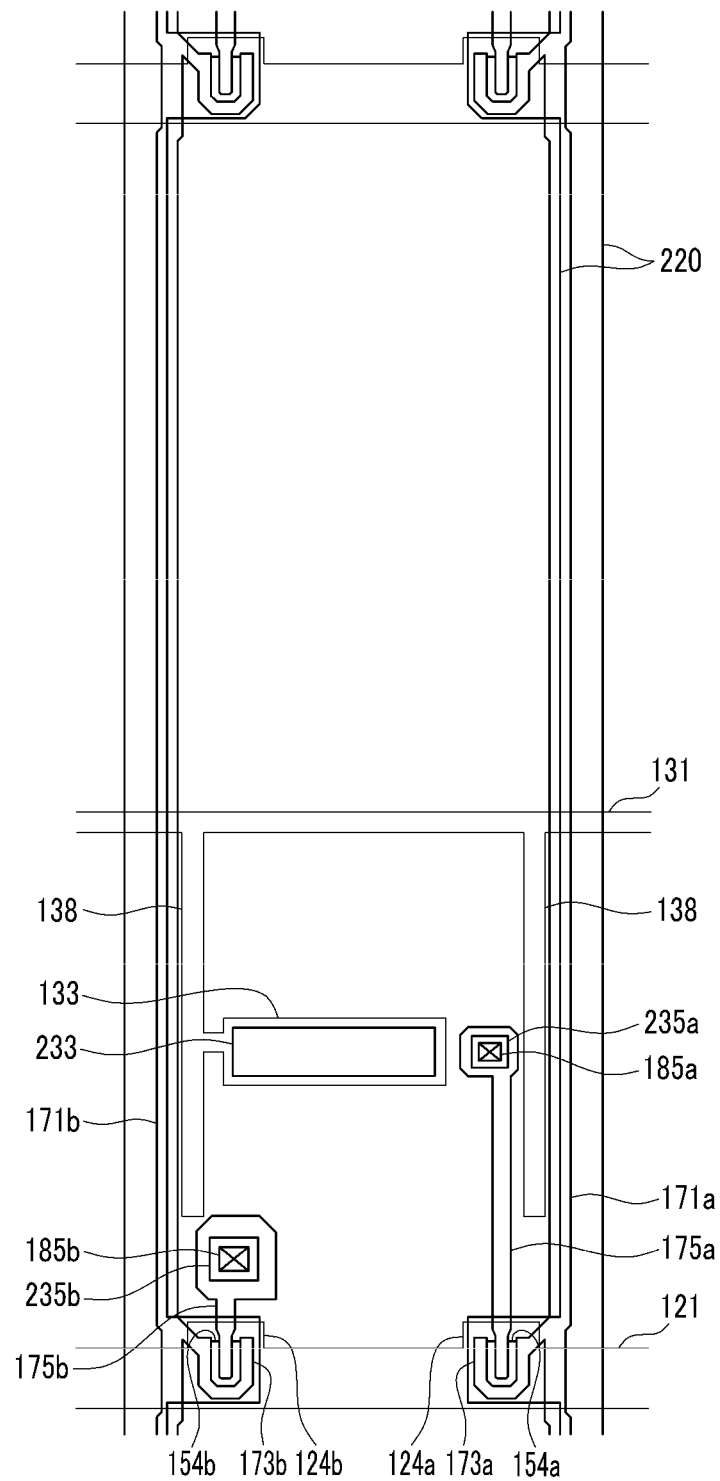
FIG. 10, FIG. 13, and FIG. 16 are layout views of the liquid crystal displays shown in FIG. 9, FIG. 12, and FIG. 15 without the pixel electrodes.
Figure 11:
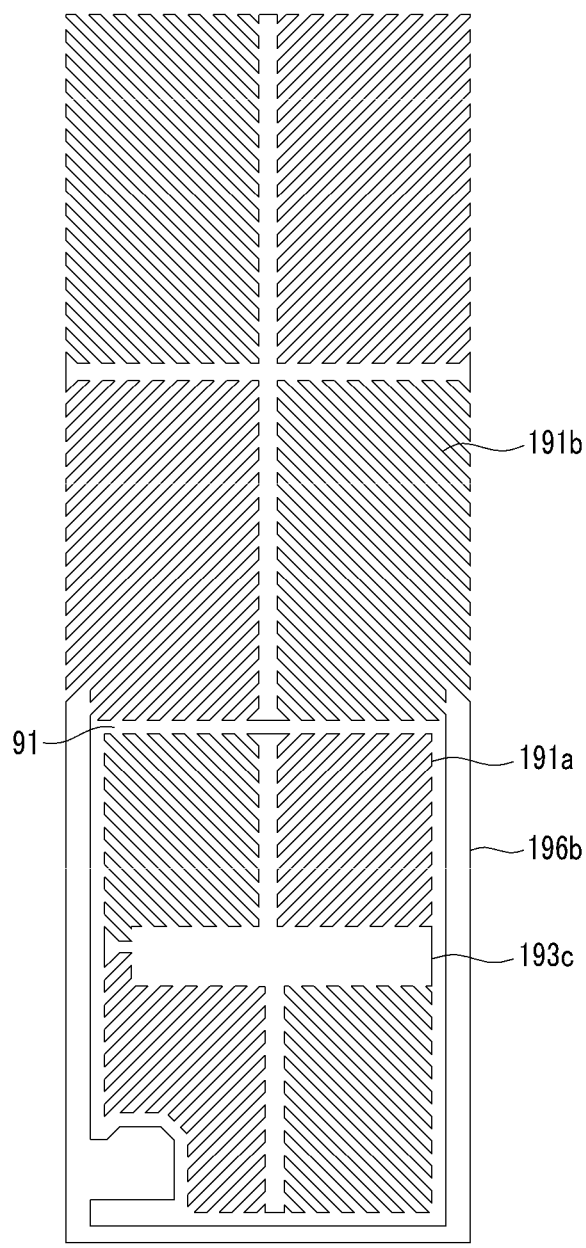
FIG. 11, FIG. 14, and FIG. 17 are top plan views of the pixel electrodes in the liquid crystal displays shown in FIG. 9, FIG. 12, and FIG. 15.

FIG. 9 is a layout view of a liquid crystal display according to another exemplary embodiment of the present invention, FIG. 10 is a layout view of the liquid crystal display shown in FIG. 9 without the pixel electrode, and FIG. 11 is a top plan view showing the pixel electrode of the liquid crystal display shown in FIG. 9.

The layered structure of the liquid crystal display according to the present exemplary embodiment is almost the same as the layered structure of the liquid crystal display shown in FIG. 2, FIG. 3, FIG. 4, and FIG. 5.

Referring to FIG. 9, FIG. 10, and FIG. 11, the storage electrode line 131 includes left and right longitudinal portions 138 extending downward from the storage electrode line 131, and a storage electrode 133 protruding in the right direction from the left longitudinal portion 138. The storage electrode 133 has the wider width than that of the other portion for overlapping with a pixel electrode 191 to be described below.

The first drain electrode 175a includes one end having a wide area extending a long distance upward, and the second drain electrode 175b includes one end having a wide area extending a short distance upward.

The color filters (not shown) have through holes 235a and 235b where contact holes 185a and 185b pass through and an opening 233 disposed on the storage electrode 133, and an upper passivation layer (not shown) and a lower passivation layer (not shown) have a plurality of contact holes 185a and 185b to expose the first and second drain electrodes 175a and 175b.

The pixel electrode 191 according to the present exemplary embodiment also includes first and second subpixel electrodes 191a and 191b that are spaced apart from each other with a gap 91 having a quadrangular belt shape, like the exemplary embodiment shown in FIG. 2, FIG. 3, FIG. 4, and FIG. 5.

The first subpixel electrode 191a is made of one basic electrode 199, as shown in FIG. 6. A transverse stem of the first subpixel electrode 191a expands upward and downward to form an expansion 193c, and the expansion 193c overlaps the storage electrode 133 in an opening 233 to form a storage capacitor Csta.

The second subpixel electrode 191b includes one basic electrode 199, and a connection bridge 196b enclosing the first subpixel electrode 191a, which is disposed below the second subpixel electrode 191b with a gap 91 therebetween.

The left lower portion of the connection bridge 196b protrudes to the right with a wide area to contact the second drain electrode 175b. As shown in FIG. 9, the second subpixel electrode 191b receives data voltages from the second drain electrode 175b through the connection bridge 196b.

The lower transverse edge of the connection bridge 196b overlaps a portion of the gate line 121 to prevent the first subpixel electrode 191a from being influenced by the gate signals of the gate lines 121.

Both longitudinal edges of the connection bridge 196b cover the data lines 171a and 171b to prevent cross talk between the data signal and the first subpixel electrode 191a.

The width of the connection bridge 196b may be in the range of 5.0 μm to 15 μm.

The storage electrode line 131 overlaps the gap 91 of the pixel electrode 191 to block light leakage between the first subpixel electrode 191a and the second subpixel electrode 191b. Also, the right and left longitudinal portions 138 of the storage electrode line 131 are disposed between the first subpixel electrode 191a and the data lines 171a and 171b, to prevent cross talk between the data lines 171a and 171b and the first subpixel electrode 191a.

The area of the second subpixel electrode 191b may be about 1.25 to 2.75 times the area of the first subpixel electrode 191a.

Unlike the above-described exemplary embodiment, according to the present exemplary embodiment, the first/second drain electrode 175a/175b do not overlap the second/first subpixel electrode 191b/191a that receive data voltages having different polarities from each other, but instead overlap only the first/second subpixel electrode 191a/191b that receive data voltages having the same polarity such that a texture due to distortion of the electric field is not generated near the first and second drain electrodes 175a and 175b even though the first and second data lines 171a and 171b receive data voltages of opposite polarities. Accordingly, texture may be prevented, which may increase transmittance.

Also, according to the present exemplary embodiment, the contact holes 185a and 185b are disposed at edges or corners of the first and second subpixel electrodes 191a and 191b so that it may be easy to form color filters (not shown) by an inkjet printing process.

Like the above described exemplary embodiment, the liquid crystal molecules are inclined in four directions such that the viewing angle of the liquid crystal display may be increased, and the liquid crystal molecules are pretilted through the polymerization of the prepolymer such that the response speed may be improved. Also, the first and second subpixel electrodes 191a and 191b receive different data voltages, which may improve side visibility.

Next, another exemplary embodiment of the present invention will be described with reference to FIG. 12, FIG. 13, and FIG. 14.

Figure 12:
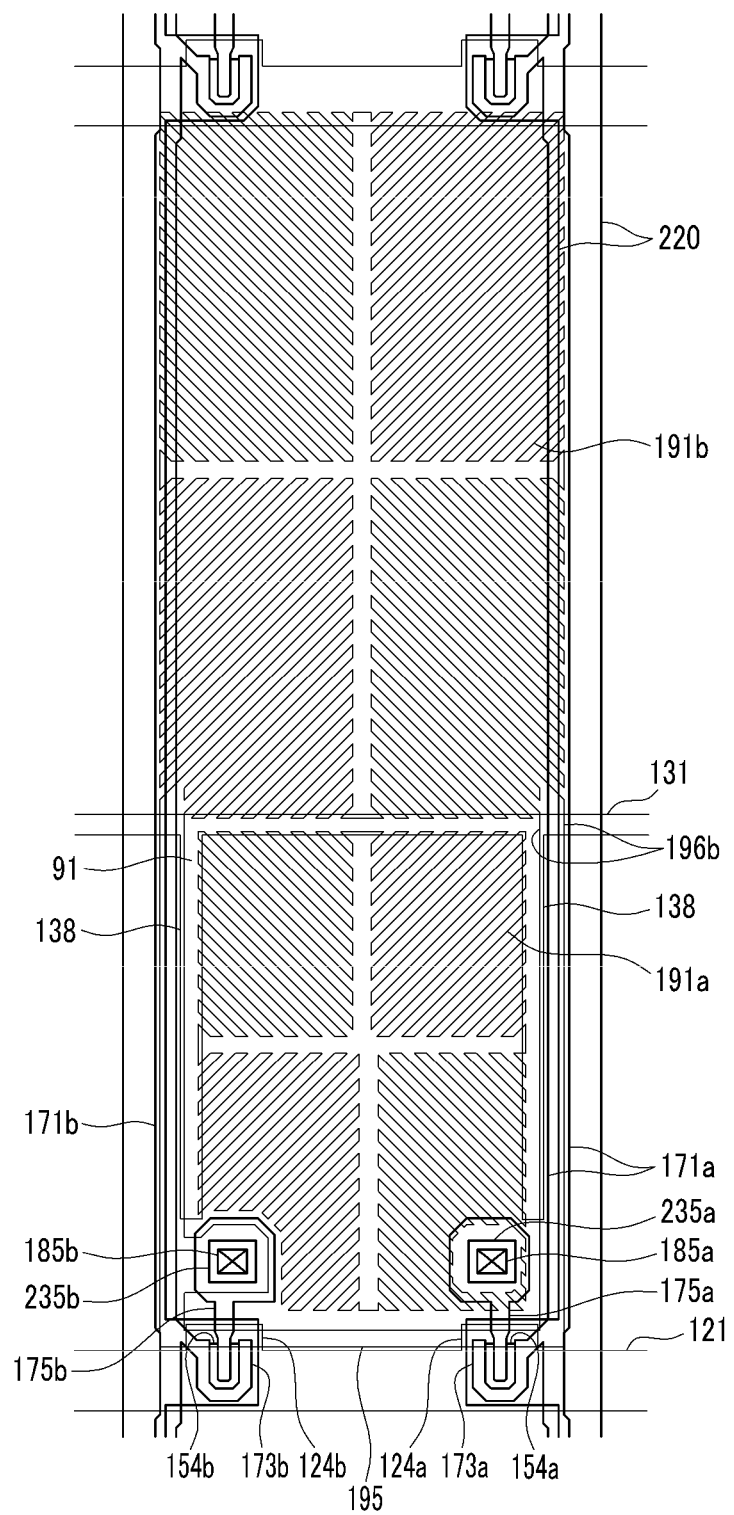
Figure 13:
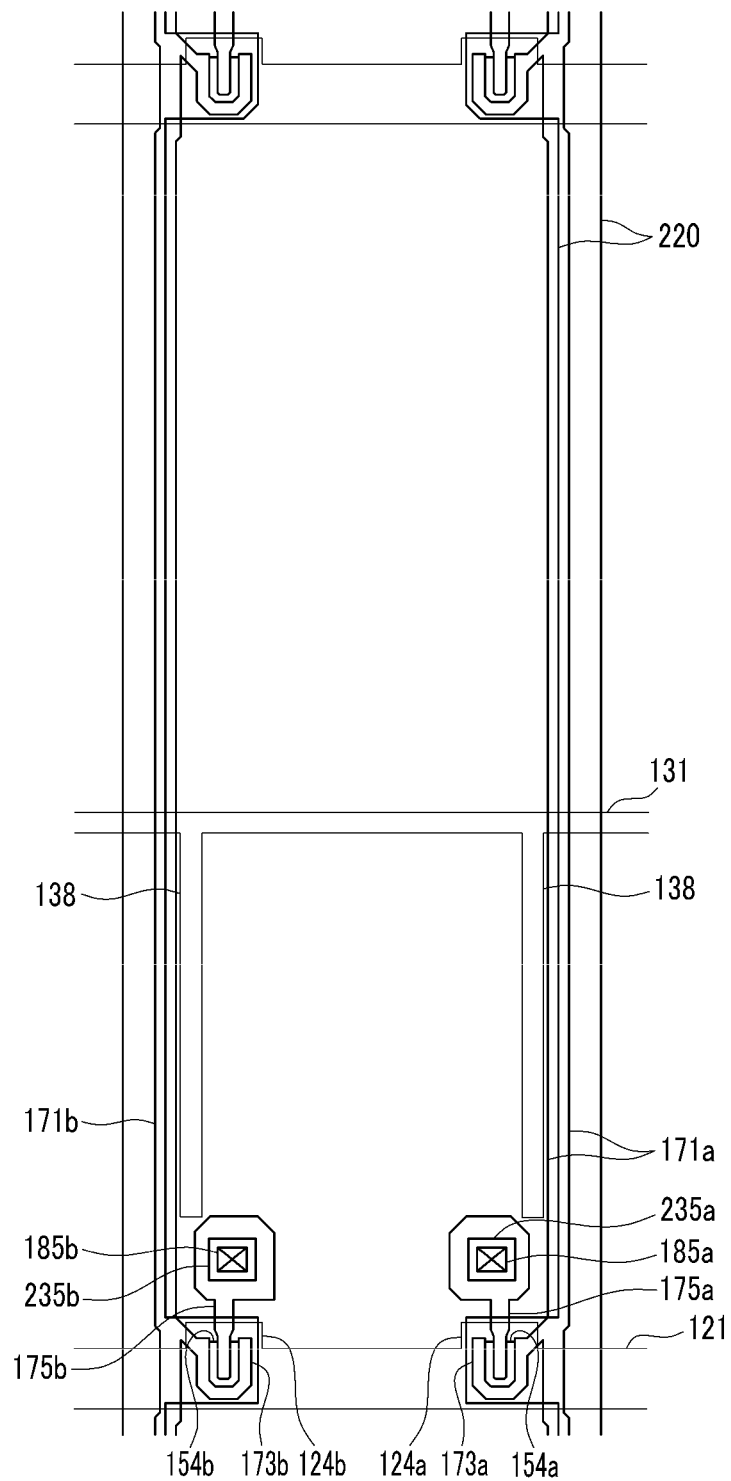
Figure 14:
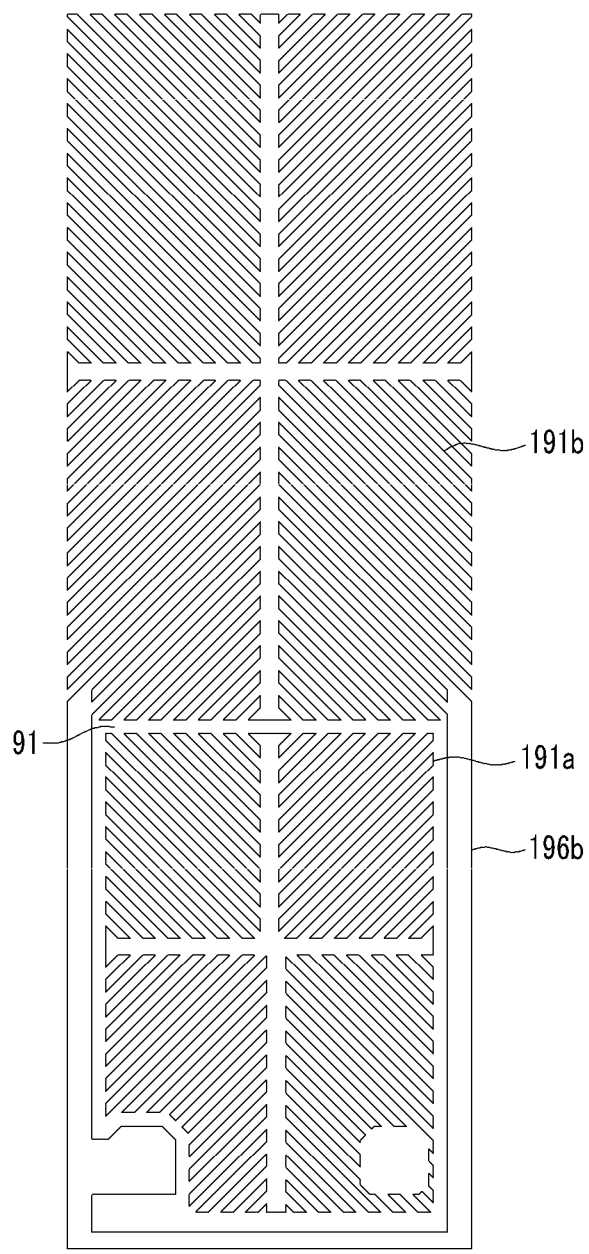

FIG. 12 is a layout view of a liquid crystal display according to another exemplary embodiment of the present invention, FIG. 13 is a layout view of the liquid crystal display shown in FIG. 12 without the pixel electrode, and FIG. 14 is a top plan view showing the pixel electrode of the liquid crystal display shown in FIG. 12.

A liquid crystal display according to the present exemplary embodiment is almost the same as the liquid crystal display shown in FIG. 9, FIG. 10, and FIG. 11.

Referring to FIG. 12, FIG. 13, and FIG. 14, the wide end portion of the first drain electrode 175a to apply the data voltage to the first subpixel electrode 191a is disposed at the right lower corner of the first subpixel PXa, and is connected to the first subpixel electrode 191a through the contact hole 185a. Accordingly, when forming the color filter (not shown) through an inkjet printing process, the process may be easily executed and the transmittance may be improved.

Also, the storage electrodes and the openings having a wide area to form the storage capacitors Csta and Cstb do not exist in the present exemplary embodiment, which may increase the aperture ratio.

Next, another exemplary embodiment of the present invention will be described with reference to FIG. 15, FIG. 16, and FIG. 17.

Figure 15:
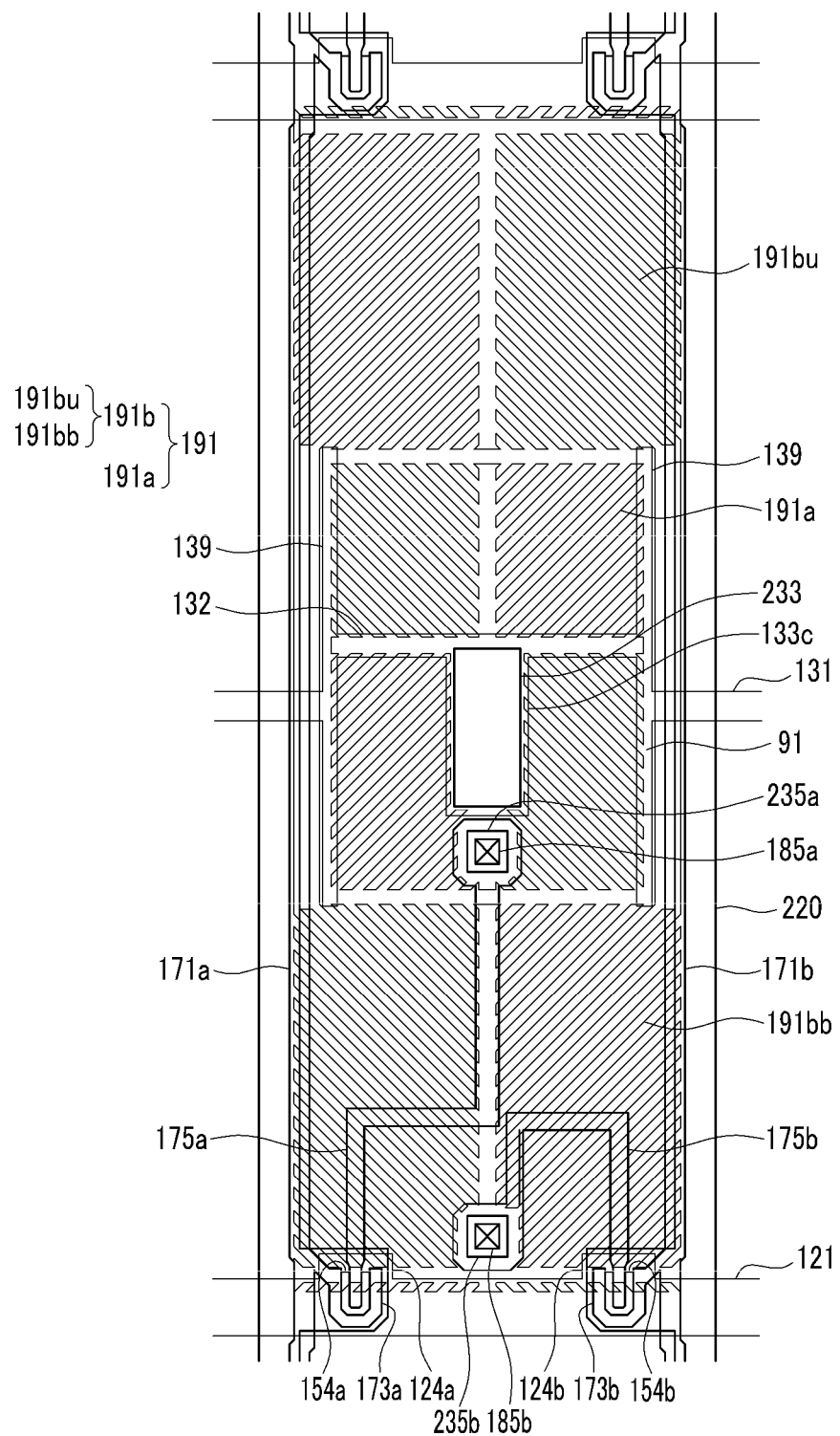
Figure 16:
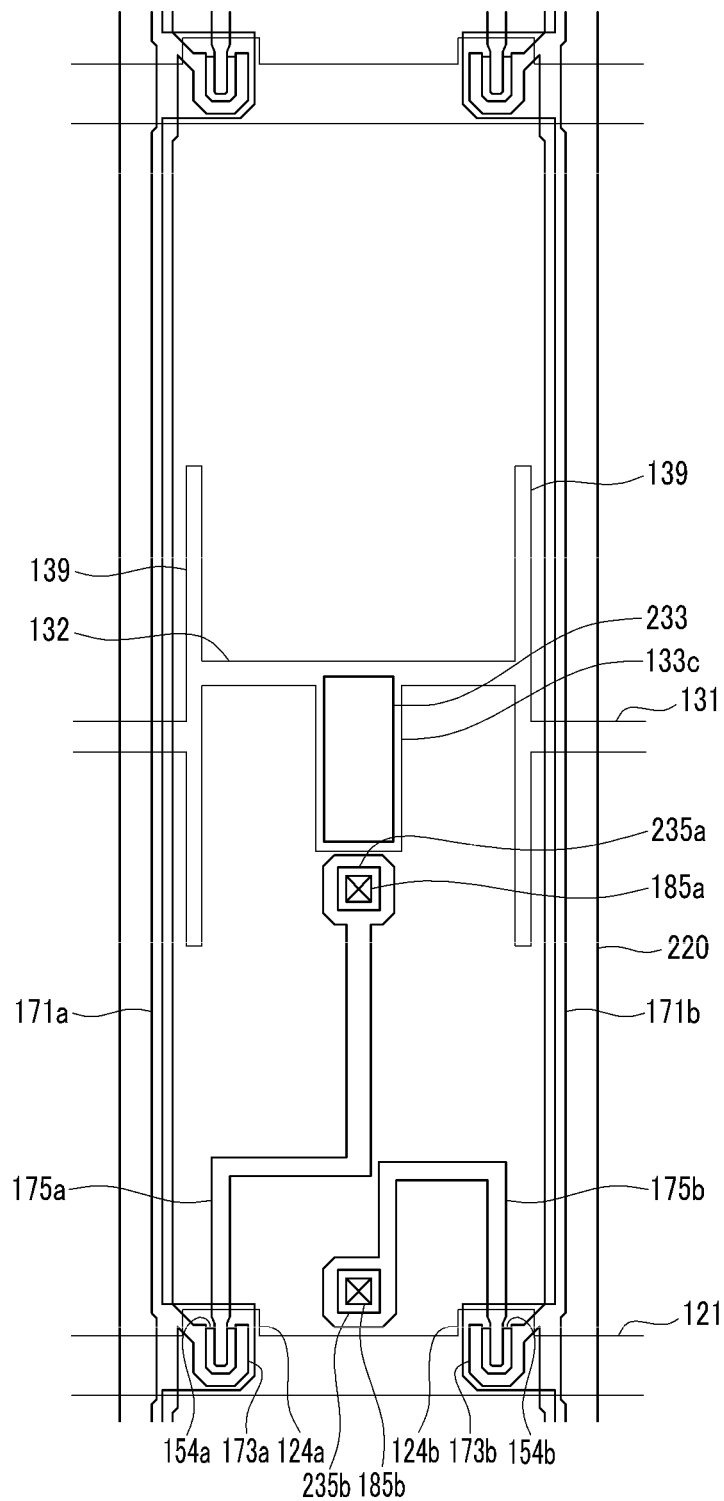
Figure 17:
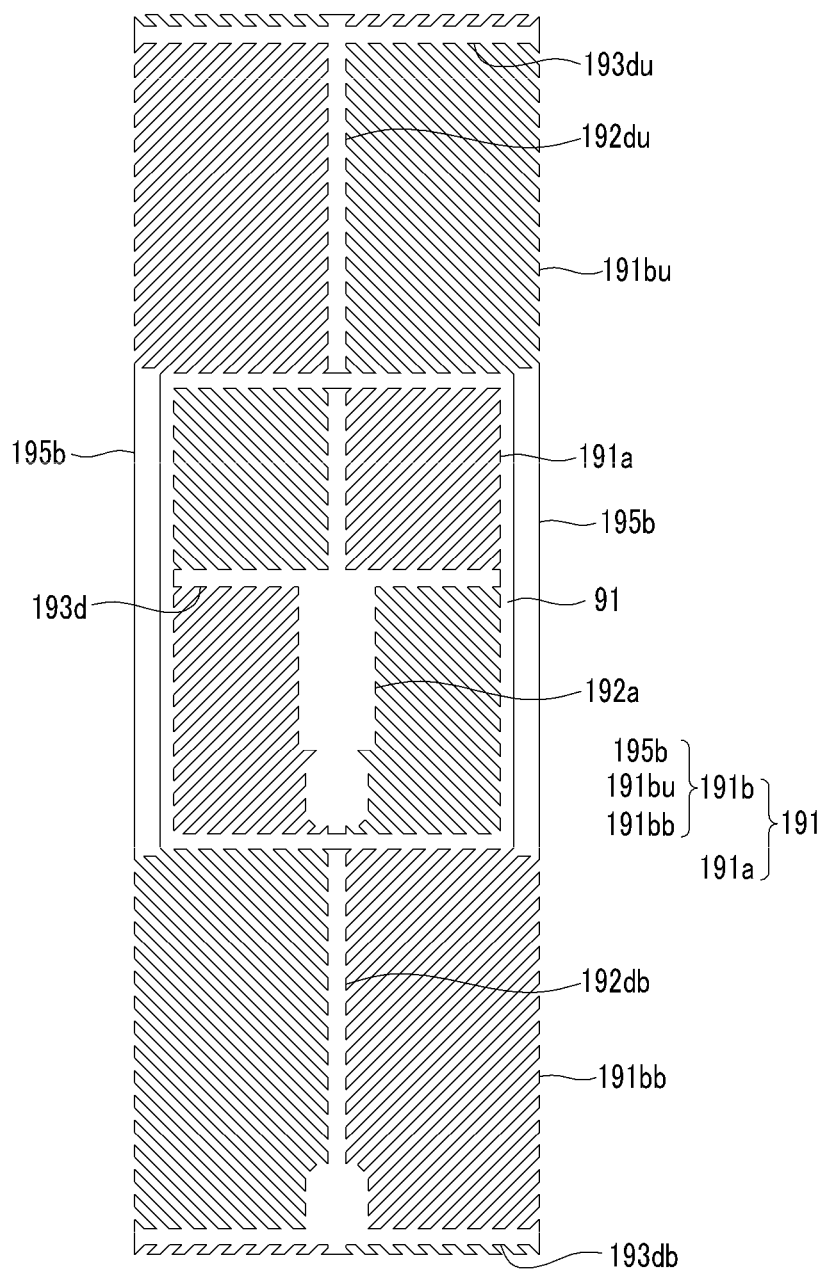

FIG. 15 is a layout view of a liquid crystal display according to another exemplary embodiment of the present invention, FIG. 16 is a layout view of the liquid crystal display shown in FIG. 15 except for the pixel electrode, and FIG. 17 is a top plan view showing the pixel electrode of the liquid crystal display shown in FIG. 15.

The layered structure of the liquid crystal display according to the present exemplary embodiment is almost the same as the layered structure of the liquid crystal display shown in FIG. 2, FIG. 3, FIG. 4, and FIG. 5.

Referring to FIG. 15, FIG. 16, and FIG. 17, the storage electrode line 131 includes left and right longitudinal portions 139 that extend upward and downward from the storage electrode line 131, a transverse connection 132 connected between two longitudinal portions 139, and a storage electrode 133c protruding from the center of the transverse connection 132 to the lower direction and having a wide area.

The color filters (not shown) have through holes 235a and 235b where contact holes 185a and 185b pass through, and an opening 233 disposed on the storage electrode 133c, and an upper passivation layer (not shown) and a lower passivation layer (not shown) have a plurality of contact holes 185a and 185b exposing the first and second drain electrodes 175a and 175b.

The pixel electrode 191 also includes the first and second subpixel electrodes 191a and 191b that are spaced apart from each other with a gap 91 having a quadrangular belt shape.

The second subpixel electrode 191b includes an upper electrode 191bu and a lower electrode 191bb, and the upper electrode 191bu and the lower electrode 191bb are connected through left and right connections 195b.

Two longitudinal portions 139 of the storage electrode line 131 overlap the gap 91 to block light leakage between the first subpixel electrode 191a and the second subpixel electrode 191b and prevent cross talk between the first subpixel electrode 191a and the data lines 171a and 171b. Also, the transverse connection 132 of the storage electrode line 131 covers the texture near the transverse stem 193d of the first subpixel electrode 191a, which may improve the aperture ratio.

In the present exemplary embodiment, different from the exemplary embodiment shown in FIG. 2, FIG. 3, FIG. 4, and FIG. 5, a transverse stem 193du of the upper electrode 191bu is not disposed on the center of the upper electrode 191bu, but is near the upper edge, and the transverse stem 193db of the lower electrode 191bb is disposed near the lower edge of the lower electrode 191bb. Accordingly, as for each of the upper and lower electrodes 191bu and 191bb, two subregions among four subregions Da, Db, Dc, and Dd of the basic electrode 199 of FIG. 6 as above-described almost disappear and remain as dummies. However, all of the subregions Da, Db, Dc, and Dd still exist in the second subpixel electrode 191*b* such that the liquid crystal molecules 310 may be inclined in four directions.

In this case, the area of the two remaining subregions Dc and Dd of the upper electrode 191*bu* may be more than 1.5 times the area of the two subregions Da and Db, which become small. The area of the two remaining subregions Da and Db of the lower electrode 191*bb* may be more than 1.5 times the area of the two subregions Dc and Dd, which may become small.

Also, the length between the upper edge and the lower edge of the two subregions Da and Db of the upper electrode 191*bu* or two subregions Dc and Dd of the lower electrode 191*bb*, which may become small, may be about 5 μm.

Like the present exemplary embodiment, two subregions Da and Db of the upper electrode 191*bu* or two subregions Dc and Dd of the lower electrode 191*bb* overlap the gate line 121 as dummies such that the aperture ratio and the transmittance may be increased and texture may be covered near the transverse stems 193*du* and 193*db*.

The reason why the two subregions Da and Dd, which are almost eliminated but remain as dummies, will be described with reference to FIG. 18 and FIG. 19.

Figure 18:
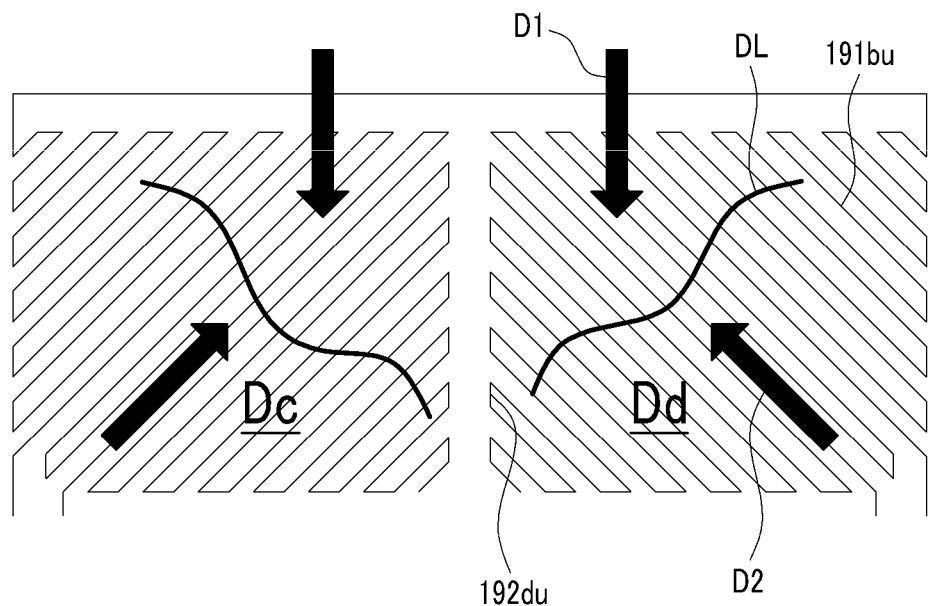
FIG. 18 is a top plan view of a portion of a pixel electrode in a liquid crystal display according to another exemplary embodiment of the present invention.
Figure 19:
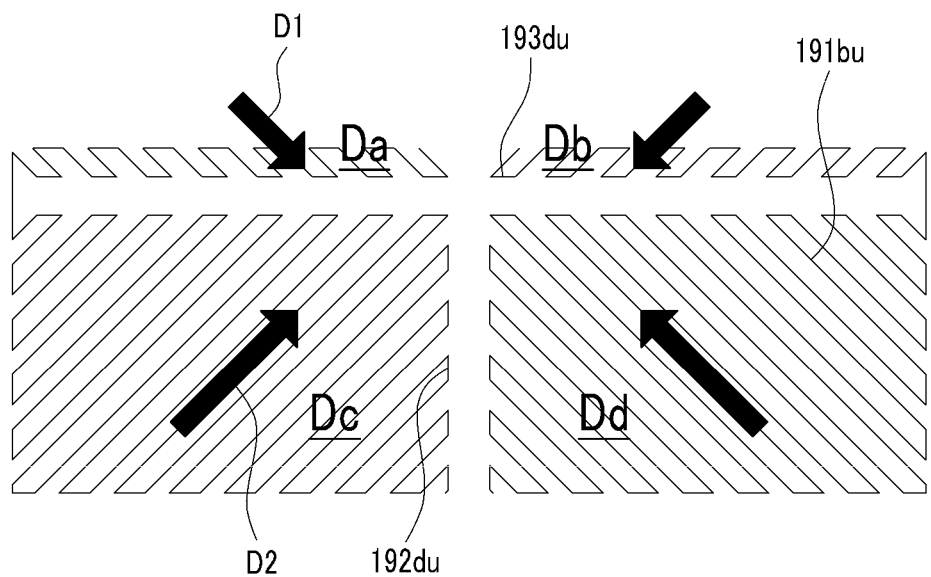
FIG. 19 is a top plan view of the portion of the pixel electrode shown in FIG. 18.

FIG. 18 is a top plan view of a portion of a pixel electrode in a liquid crystal display according to another exemplary embodiment of the present invention, and FIG. 19 is a top plan view of the portion of the pixel electrode shown in FIG. 17.

As shown in FIG. 18, if two subregions Da and Db of the upper electrode 191*bu* are altogether removed, a fringe field is generated in the direction D1 vertical to the upper edge of the upper electrode 191*bu*. Thus, disclination DL of the liquid crystal molecules 310 may generated, which may generate a texture because the inclined direction D2 of the liquid crystal molecules 310 in the two subregions Dc and Dd discord with the direction D1 of the fringe field.

However, as shown in FIG. 19, if the two subregions Da and Db are left as dummies at the top of the upper electrode 191*bu*, the liquid crystal molecules 310 are inclined in the direction D1 such that the horizontal inclination direction of the liquid crystal molecules 310 of the subregions Da and Db is the same as that of the liquid crystal molecules 310 of the subregions Dc and Dd, and thereby the texture may be weakened.

The longitudinal stems 192*du* and 192*db* of the upper and the lower electrodes 191*bu* and 191*bb* of the second subpixel electrode 191*b* may be positioned near the left edge or the right edge of the pixel PX, instead of locating the transverse stems 193*du* and 193*db* of the upper or lower electrodes 191*bu* or 191*bb* of the second subpixel electrode 191*b* near the upper and lower edges of the pixel PX like the present exemplary embodiment, such that a difference between the areas of the left subregions Da and Dc and the right subregions Db and Dd may be generated. In this case, the area of the subregions which become wide, may be more than 1.5 times the area of the subregions which become small.

Also, according to the present exemplary embodiment, differently from the exemplary embodiment shown in FIG. 2, FIG. 3, FIG. 4, and FIG. 5, the transverse stem 193 of the first subpixel electrode 191*a* does not include the expanded portion, and the portion disposed under the longitudinal stem 192 expands at both sides to form a third expansion 192*a*. Also, the a portion to contact with the first drain electrode 175*a* is formed under the third expansion 192*a*, and another wide portion for the contact with the second drain electrode 175*b* is formed at the bottom of the longitudinal stem 192*db* of the lower electrode 191*bb* of the second subpixel electrode 191*b*.

In the present exemplary embodiment, as in the previously described exemplary embodiment, the liquid crystal molecules are inclined in four directions so that the viewing angle of the liquid crystal display may be increased, and the liquid crystal molecules are pretilted by the polymerization of the prepolymer, which may improve the response speed. Also, the first and second subpixel electrodes 191*a* and 191*b* receive different data voltages, which may improve side visibility.

Different from an exemplary embodiment of the present invention, a light alignment method in which light such as ultraviolet rays is obliquely irradiated to the alignment layers 11 and 21 may be used to control the alignment direction and the alignment angle of the liquid crystal molecules 310 to form a plurality of subregions Da, Db, Dc, and Dd where the liquid crystal molecules 310 are inclined in different directions. In this case, the branches 194*a*, 194*b*, 194*c*, and 194*d* of the pixel electrodes 191 are not necessary to increase the aperture ratio and improve the response time due to the pretilt of the liquid crystal molecules 310, which is generated by light alignment.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a plurality of pixels, each of the plurality of pixels comprising a pixel electrode comprising a first pixel electrode electrically connected to one of a first transistor and a second transistor and a second pixel electrode electrically connected to the other one of the first transistor and the second transistor, the first pixel electrode and the second pixel electrode being separated from each other;
a common electrode facing the pixel electrode; and
a liquid crystal layer disposed between the pixel electrode and the common electrode, the liquid crystal layer comprising a plurality of liquid crystal molecules, the liquid crystal molecules being substantially vertically aligned with respect to a plane of the pixel electrode or the common electrode in the absence of an electric field in the liquid crystal layer,
wherein the liquid crystal layer on the first pixel electrode is divided into a plurality of domains and the liquid crystal layer on the second pixel electrode is divided into a plurality of domains,
wherein each of the domains is defined by an orientation direction of the liquid crystal molecules when a voltage is applied to the first pixel electrode and the second pixel electrode, and
wherein two domains of the plurality of domains on the first pixel electrode and two domains of the plurality of domains on the second pixel electrode are arranged in a row.

2. The liquid crystal display of claim 1, further comprising:
a passivation layer disposed under the pixel electrode; and
a storage electrode line extending across the pixel electrode,
wherein the passivation layer comprises a contact hole overlapping a portion of the storage electrode line.

3. The liquid crystal display of claim 2, further comprising:
a drain electrode disposed under the passivation layer,
wherein the contact hole exposes the drain electrode, and
wherein the drain electrode is electrically connected to the pixel electrode through the contact hole.

4. The liquid crystal display of claim 3, wherein:
the drain electrode comprises a first portion and a second portion;
the first portion is substantially parallel to a gate line extending in a first direction; and
the second portion is substantially parallel to a data line extending in a second direction.

5. The liquid crystal display of claim 3, wherein the contact hole is disposed at a central portion of the pixel electrode.

6. The liquid crystal display of claim 5, wherein a portion of the storage electrode line overlaps a portion of the drain electrode.

7. The liquid crystal display of claim 5, wherein a portion of the storage electrode line is disposed between adjacent domains of the plurality of domains on at least one of the first pixel electrode and the second pixel electrode.

8. The liquid crystal display of claim 7, wherein a portion of the drain electrode is disposed between adjacent domains of the plurality of domains on at least one of the first pixel electrode and the second pixel electrode.

9. The liquid crystal display of claim 5, wherein a portion of the drain electrode is disposed between adjacent domains of the plurality of domains on at least one of the first pixel electrode and the second pixel electrode.

10. The liquid crystal display of claim 1, further comprising:
a drain electrode comprising a first portion and a second portion,
wherein the first portion is substantially parallel to a gate line extending in a first direction, and
wherein the second portion is substantially parallel to a data line extending in a second direction.

11. The liquid crystal display of claim 1, further comprising:
a storage electrode line extending across the pixel electrode; and
a drain electrode electrically connected to the pixel electrode through a contact hole,
wherein a portion of the storage electrode line overlaps a portion of the drain electrode.

12. The liquid crystal display of claim 1, further comprising:
a storage electrode line extending across the pixel electrode,
wherein a portion of the storage electrode line is disposed between adjacent domains of the plurality of domains on at least one of the first pixel electrode and the second pixel electrode.

13. The liquid crystal display of claim 12, further comprising:
a drain electrode electrically connected to the pixel electrode,
wherein a portion of the drain electrode is disposed between adjacent domains of the plurality of domains on at least one of the first pixel electrode and the second pixel electrode.

14. The liquid crystal display of claim 1, further comprising:
a drain electrode electrically connected to the pixel electrode,
wherein a portion of the drain electrode is disposed between adjacent domains of the plurality of domains on at least one of the first pixel electrode and the second pixel electrode.

15. The liquid crystal display of claim 1, further comprising an alignment layer disposed on the pixel electrode, wherein the alignment layer is irradiated by light to generate pretilt of the liquid crystal molecules.

* * * * *